Aug. 31, 1943.      R. A. FRANCIS      2,328,445
BLACKOUT LIGHT
Filed May 4, 1942      2 Sheets-Sheet 2
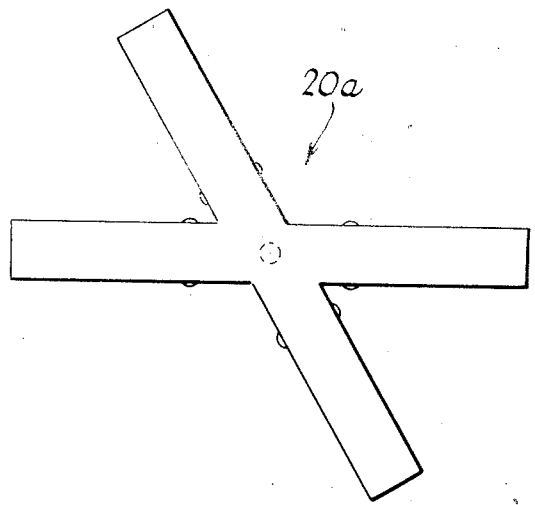
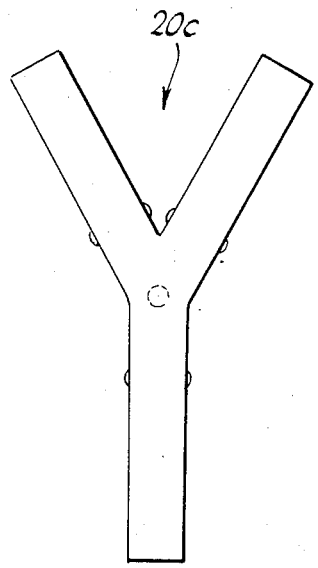
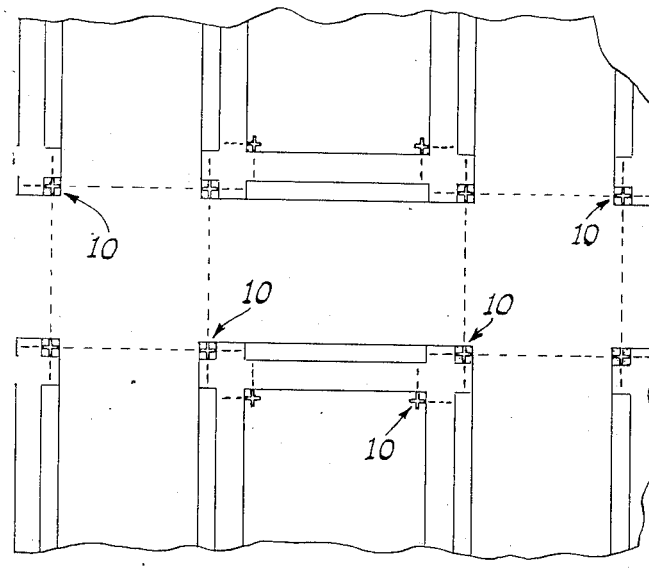
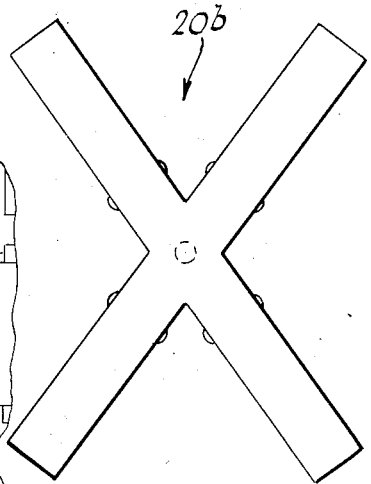
INVENTOR.
RAYMOND ARTHUR FRANCIS
BY
Carl Miller
ATTORNEY Patented Aug. 31, 1943

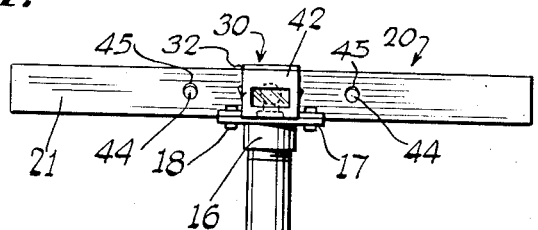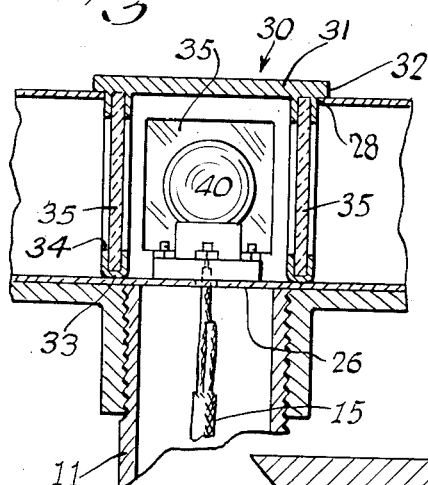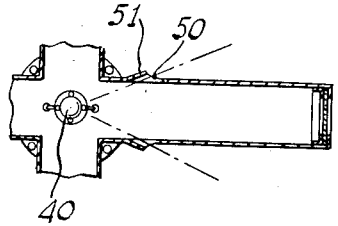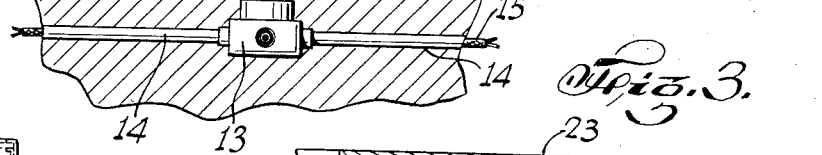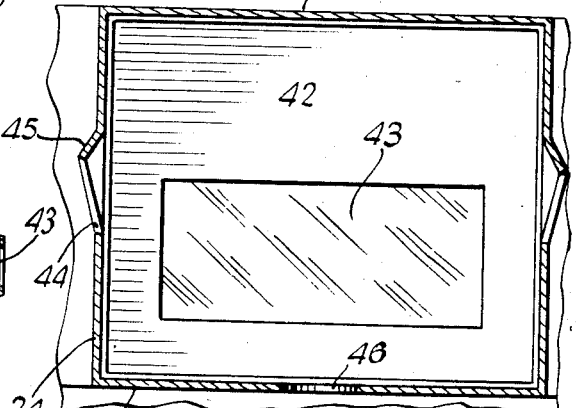

2,328,445

UNITED STATES PATENT OFFICE 2,328,445

BLACKOUT LIGHT

Raymond Arthur Francis, Zanesville, Ohio

Application May 4, 1942, Serial No. 441,609

1 Claim. (Cl. 240—25)

This invention relates to a blackout light. It is particularly directed to a street light to be used during blackouts.

An object of this invention is to provide a blackout light having means for casting light downwardly, but not upwardly.

A further object of this invention is to provide a blackout light of the character described, which shall be characterized by its cheapness of construction and installation and also by its rapidity of installation. The blackout light embodying the invention provides a good blackout light for pedestrians and traffic and for location of air raid shelters, landmarks, etc., and which may be wired underground or overhead, and which will throw light in certain directions only, and in which a dim light only is passed.

Yet another object of this invention is to provide a blackout light having wiring which may be plugged into residences at corners of streets.

Yet a further object of this invention is to provide blackout lights which will produce light channels between which the pedestrians can walk and thus judge location of walks and street corners and inter-sections. The blackout light also has side openings which become illuminated so that the pedestrian can see where the blackout light is located.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawings, in which is shown various possible illustrative embodiments of this invention, Fig. 1 is an elevational view of a blackout light embodying the invention;

Fig. 2 is a top plan view thereof, with parts broken away and in cross-section;

Fig. 2a is a partial view similar to Fig. 2, but illustrating a modified construction;

Fig. 3 is an enlarged, cross-sectional view taken on line 3—3 of Fig. 2, with the panel for the light chamber removed;

Figs. 4, 5 and 6 are top plan views of the blackout device and illustrating modified constructions;

Fig. 7 is a top plan view of a portion of city streets illustrating the positions at which the blackout light may be installed; and Fig. 8 is a cross-sectional view taken on line 8—8 of Fig. 2.

Referring now in detail to the drawings, 10 designates a blackout light embodying the invention. The same comprises a hollow tubular post 11, the lower end whereof is embedded in the ground 12.

At the lower end of the post 11, and within the ground 12, is a splice box 13, to which are connected conduits 14 for the wiring 15 which passes through the conduits into the splice box 13 and upwardly into the post 11. At the upper end of the post 11 is screwed a hub 16 formed with a horizontal annular flange 17. Mounted on and attached to the flange 17, as by bolts 18, is a horizontal casing 20 having a plurality of radial tubular portions 21. Each of the tubular portions 21 has a bottom wall 22, a top wall 23 and side walls 24, and may be square in cross-section, as illustrated in the drawings.

At the center of the casing 20 is the light chamber 26. Each of the tubular casing portions 21 forms a light channel 27. The top of the casing 20 is formed with a square central opening 28, in which is fitted a light box 30, having a top wall 31 formed with flanges 32 overlapping the top of the casing 20. Extending downwardly from top wall 31, are vertical walls 33 formed with openings 34 and carrying panes 35 of colored glass, enclosing the light chamber 26.

Supported at the upper end of the post 11 in any suitable manner, and projecting upwardly into the light chamber 26, is a lamp 40. At the outer end of each of the tubular casing portions 21, is an end wall 42 extending about half way down from the top. Behind the end wall 42 is another pane of glass 43. The side walls 24 are formed with openings 44 and above each opening is an outwardly and downwardly projecting hood or shade 45, so that light will be reflected downwardly through said openings. The bottom walls 22 may also be formed with openings 46, if desired.

It will now be noted that each blackout light will cause rays of light in radial directions along the axes of the channels 27.

The blackout lamps may be located in the corners of the sidewalks, as shown in Fig. 7 of the drawings, with the channels 27 running in the same directions as the sidewalks. Additional blackout lamps may be placed at the corners of the buildings likewise, as shown in Fig. 7 of the drawings, and also with the channels 27 running in the same directions as the sidewalks. Thus, at each corner of a block there will be four channels of light, two channels being perpendicular to one sidewalk and two perpendicular to the other sidewalk. Pedestrians by looking for the channels of light may be guided to the corners and will thus know where the corners are located.

Furthermore, it will be noted that channels of light will be thrown across each street intersection, as shown by the dotted lines in Fig. 7. If there is any traffic, therefore, they will be guided to the corners by the location of the channels of light which cross the intersections.

If desired, the tinted or colored panels 35 may be omitted and the bulb of the lamp 40 may instead be tinted or colored in any desired color.

Preferably there is employed a blue colored bulb, properly colored with a black paint, or a clear bulb, properly colored with a black paint, that will give the proper glow or degree of light which in practice seems to blend with or be absorbed by, the darkness or "night light." The glow while plainly visible to pedestrians or traffic in the channel of light, from the outer end openings of tubular portions 21, is practically invisible from a strictly "side view" of the channel of light.

With regard to colored panels 35, any suitable material can be used. If clear glass is used for the panels 35, then they must be sprayed or tinted with black colored paint until the proper glow is obtained, from the light in lamp 40, shining through the panels 35. It is likely that the proper glow could be obtained by the use for the panels 35, of the proper shade (color) of manufactured colored glass.

The tubular portions 21 preferably should be painted a color of dull black on the inside and the casing 20 should preferably be painted a black color on the outside.

In Fig. 2a there is shown a modification in which the openings 44 are replaced by openings 50 having slots 51 which are radial to the center of the lamp 40. With this construction, light will radiate from the lamp through the openings 50 without interruption.

It will be noted that no light shines upwardly, only sideways, and if desired, downwardly.

While the channels 27 of casing 20 are shown at right angles to each other, the channels may be at any desired angle to one another. Thus, in Figs. 4 and 6 there are shown X-shaped casings 20a and 20b, respectively, whereas in Fig. 5 there is shown casing 20c which is in the shape of a Y.

The wiring for the lamp 40 may be underground as shown in the drawings. If desired, however, the wiring may be overhead, and may pass to the corner residences and plugged into outlets there.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

A blackout light comprising a central tubular post, a casing mounted on the post and having radial tubular portions, a lamp at the upper end of the post and in the center of said casing, the center of the top of the casing being formed with an opening, and a box removably mounted within the casing and having light transmitting colored panels aligned with said tubular portions.

RAYMOND ARTHUR FRANCIS.